Patented July 21, 1953

2,646,434

UNITED STATES PATENT OFFICE 2,646,434

METHOD OF PREPARING Δ⁴-PREGNENES

Seymour Bernstein, Pearl River, and Milton D. Heller, Monsey, N. Y., assignors to American Cyanamid Company, New York, N. Y., a corporation of Maine No Drawing. Application April 3, 1952, Serial No. 280,382

4 Claims. (Cl. 260—397.4)

This invention relates to a method of preparing steroid compounds. More particularly, it relates to the preparation of Δ⁴-pregnene-11β,17α,20β,21-tetrol-3-one-20,21-diacetate.

Considerable interest has been shown recently in the chemical literature concerning certain compounds of the steroid field. Compounds having a particular side chain in the 17-position and keto or hydroxyl groups in the 3- and 11-positions are of particular interest. One of these compounds which occurs naturally in the adrenal cortex is commonly referred to as cortisone and has been found to be highly active in the treatment of arthritis, rheumatic fever and other pathological conditions broadly classified as rheumatic diseases. The compound cortisone may be described chemically as Δ⁴-pregnene-17α,21-diol-3,11,20-trione. A compound related to cortisone, described in the literature as Reichstein's "Substance E" diacetate, has been isolated from the adrenal cortex. This compound has the following structural formula:

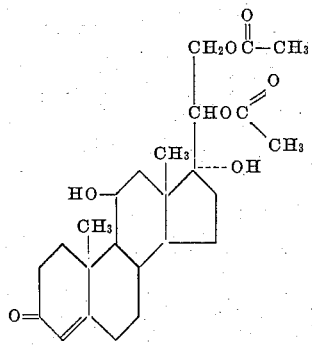

We have now found a new method of preparing Reichstein's "Substance E" diacetate. This compound is prepared by reacting Δ⁵-pregnene-17α,21-diol-3,11,20-trione-3-ethylene ketal-21-acetate with lithium aluminum hydride in a solvent and subsequently treating the reaction product with acetic anhydride in a solvent such as pyridine.

The intermediate used in the process of the present invention is prepared by reacting cortisone acetate with ethylene glycol in a solvent. It is usually desirable to have present paratoluenesulfonic acid monohydrate and to constantly remove the water formed in the course of the reaction as shown in the example hereinafter.

In carrying out the process of the present invention we prefer to dissolve the Δ⁵-pregnene-17α,21-diol-3,11,20-trione-3-ethylene ketal-21-acetate in a solvent such as anhydrous tetrahydrofuran and to react the product in solution with lithium aluminum hydride, also in a suitable solvent. The latter solvent may be an ether such as diethyl ether, dipropyl ether, dibutyl ether, diamyl ether, and the like. The reaction is usually complete within a period of from 15 minutes to two hours, at a temperature of from about 20° C. to about 150° C. The lithium aluminum hydride is then decomposed with water and the aluminum hydroxide formed is removed by filtration. The reaction product is then reacted with acetic anhydride in a solvent such as pyridine. The desired product is recovered from the reaction mixture by extraction with an organic solvent such as ethyl acetate. The product is then recovered from the solvent by removal of the solvent under reduced pressure. A pure product is obtained by recrystallization from an organic solvent or a mixture of solvents such as ethyl acetate-diethyl ether.

The following example illustrates the preparation of Reichstein's "Substance E" diacetate using as a starting material cortisone acetate.

Example

A mixture of 2 g. of cortisone acetate in 16 ml. of ethylene glycol and 70 ml. of benzene was distilled for a short time for removal of traces of water. The cortisone acetate during this distillation did not go into solution. Sixty milligrams of paratoluenesulfonic acid monohydrate was added and the mixture was refluxed for 4 hours with constant removal of water. During this time the cortisone acetate dissolved and in a short time thereafter the product separated. It was collected and washed successively with benzene, methanol, dilute methanol, sodium bicarbonate solution, water and methanol. Recrystallization from dilute pyridine and dilute dimethylformamide gave 1.31 g. of Δ⁵-pregnene-17α,21-diol-3,11,20-trione-3-ethylene ketal-21-acetate, melting point 260°–264° C. (Consistent melting points were difficult to obtain; melting point was no criterion of purity.)

To a cooled solution of 1.19 g. of Δ⁵-pregnene-17α,21-diol-3,11,20-trione-3-ethylene ketal-21-acetate in 135 ml. of anhydrous tetrahydrofuran was added slowly 19 ml. of a lithium aluminum hydride solution in anhydrous ether (25 g. in 250 ml. of ether). The resultant slightly turbid solution was refluxed two and one-half hours, cooled, and the excess lithium aluminum hydride cautiously decomposed with water. After filtering off the aluminum hydroxide, it was washed several times with ethyl acetate and ether. The combined organic layers were separated from the aqueous phase and the water layer extracted several times with ether and ethyl acetate. The combined organic layers were dried over anhydrous magnesium sulfate, filtered and concentrated to give a glass. The glass was refluxed in a solution of 100 ml. of methanol and 13 ml. of eight and one-half percent (volume/volume) sulfuric acid for forty minutes. After cooling, the solution was neutralized by adding solid sodium bicarbonate, filtered and the solvents removed under reduced pressure. A small amount of benzene was added and removed under reduced pressure to eliminate traces of water. The solid residue was dissolved in 5 ml. of dry pyridine and 5 ml. of acetic anhydride in the cold and allowed to stand fifteen hours at room temperature. Water was added and the mixture extracted with ethyl acetate, dried over anhydrous magnesium sulfate, filtered and the solvent removed under reduced pressure. Addition of ether to the oily residue gave a white solid which was filtered off. Several recrystallizations from ethyl acetate-ether gave pure Δ⁴-pregnene-11β,17α,20β,21-tetrol-3-one-20,21-diacetate, melting point 231°–232° C., λ absolute alcohol maximum 241 mµ, $e\ 241=15{,}250\ [\alpha]_D^{25}=+164.1°$ (acetone).

We claim:

1. A method of preparing the compound having the formula:

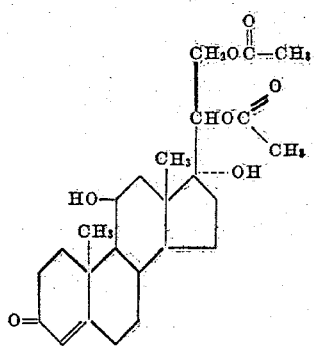

which comprises reacting Δ⁵-pregnene-17α,21-diol-3,11,20-trione-3-ethylene ketal-21-acetate in solution with lithium aluminum hydride in a solvent and subsequently with acetic anhydride in a solvent and recovering said compound therefrom.

2. A method in accordance with claim 1 in which the initial reactant is dissolved in tetrahydrofuran.

3. A method in accordance with claim 1 in which the initial reactant is dissolved in tetrahydrofuran and the lithium aluminum hydride is dissolved in diethyl ether.

4. A method of preparing Δ⁴-pregnene-11β,17α,20β,21-tetrol-3-one-20,21-diacetate which comprises heating Δ⁵-pregnene-17α,21-diol-3,11,20-trione-3-ethylene ketal-21-acetate in tetrahydrofuran in the presence of lithium aluminum hydride and diethyl ether and subsequently reacting the product thereof with acetic anhydride in the presence of pyridine and recovering said compound therefrom.

SEYMOUR BERNSTEIN.
MILTON D. HELLER.

No references cited.